United States Patent [19]

van der Lely et al.

[11] 4,131,237
[45] Dec. 26, 1978

[54] SPREADING IMPLEMENTS

[75] Inventors: Ary van der Lely, Maasland; Cornelis J. G. Bom, Rozenburg, both of Netherlands

[73] Assignee: C. van der Lely NV, Maasland, Netherlands

[21] Appl. No.: 640,730

[22] Filed: Dec. 15, 1975

[30] Foreign Application Priority Data

Dec. 19, 1974 [NL] Netherlands .............. 7416559

[51] Int. Cl.² .............................................. A01C 17/00
[52] U.S. Cl. .................................... 239/664; 239/666; 239/671; 239/684; 239/687
[58] Field of Search ............... 239/650, 661, 670, 672, 239/673–677, 679–681, 683, 684, 687, 142, 155, 161, 163, 166, 167, 170, 172, 176, 656, 664, 665, 666, 214; 198/128, 53 R, 56–58, 204, 312, 313, 317, 318, 532, 538, 541, 547, 564, 566, 638, 642, 860, 861; 214/518–522

[56] References Cited

U.S. PATENT DOCUMENTS

| | | | |
|---|---|---|---|
| 1,472,957 | 11/1923 | Bliss | 239/665 |
| 1,489,753 | 4/1924 | Fraley | 198/204 X |
| 2,190,619 | 2/1940 | Watson | 239/687 X |
| 2,638,350 | 5/1953 | Lyerly | 239/661 |
| 2,723,860 | 11/1955 | Weeks | 239/661 X |
| 2,743,932 | 5/1956 | Wester | 239/664 |
| 2,782,943 | 2/1957 | Jones et al. | 198/318 X |
| 2,793,738 | 5/1957 | Erickson | 198/860 |
| 2,863,669 | 12/1958 | Allersma | 239/664 |
| 2,947,544 | 8/1960 | Hurt | 239/675 X |
| 2,976,643 | 3/1961 | Chafer | 239/655 |
| 3,329,030 | 7/1967 | Dijkhof | 239/167 X |
| 3,448,848 | 6/1969 | Washburn | 198/314 |
| 3,556,404 | 1/1971 | Walker | 239/167 |
| 3,559,893 | 2/1971 | Gruben | 239/673 X |
| 3,568,937 | 3/1971 | Grataloup | 239/655 |
| 3,633,796 | 1/1972 | Zweegers | 239/664 X |

Primary Examiner—Evon C. Blunk
Assistant Examiner—Andres Kashnikow
Attorney, Agent, or Firm—Mason, Mason & Albright

[57] ABSTRACT

A spreading implement has laterally extending conveyors of different lengths that form a boom to each side of a hopper. At the outer ends of the conveyors, rotatable spreading discs are mounted spaced apart from one another and each conveyor is an endless belt in a channel shaped guide. A slideable flow control is positioned beneath a port in the bottom at each side of the hopper to regulate the amount of material fed to the conveyors. Driving means, including a power take-off connection and a belt and pulley transmission move the conveyors and rotate the discs. At the end of each conveyor, a downwardly extending guide allows material to flow to a lower disc. Each boom is pivoted to the implement frame with a latch and pivot connection to be displaceable about a vertical axis to a rearwardly extending transport position. Also, each boom is comprised of spaced apart beams that are comprised by two portions that are interconnected with a further pivot and a latch connection. Upon striking an obstacle that overloads the latch, the outer boom portion can pivot rearwardly or the entire boom can so pivot. The conveyor belts and drive connections are slackened when the boom or its portions are pivoted with respect to one another. The discs can be mounted to rotate about axes located to the rear of the center lines of their respective conveyors. An eccentric drive connection moves an agitator above each port to ensure a steady flow of material to the discs.

20 Claims, 21 Drawing Figures

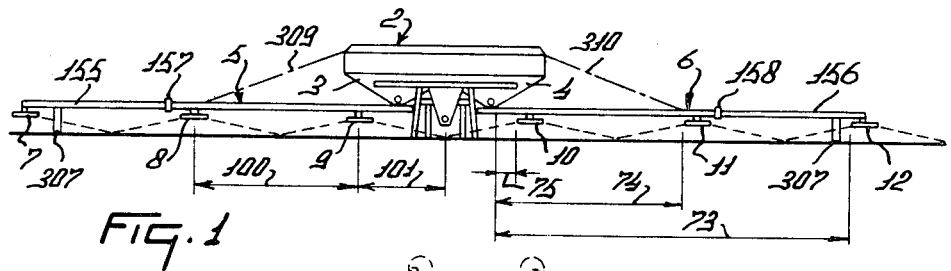
FIG. 1
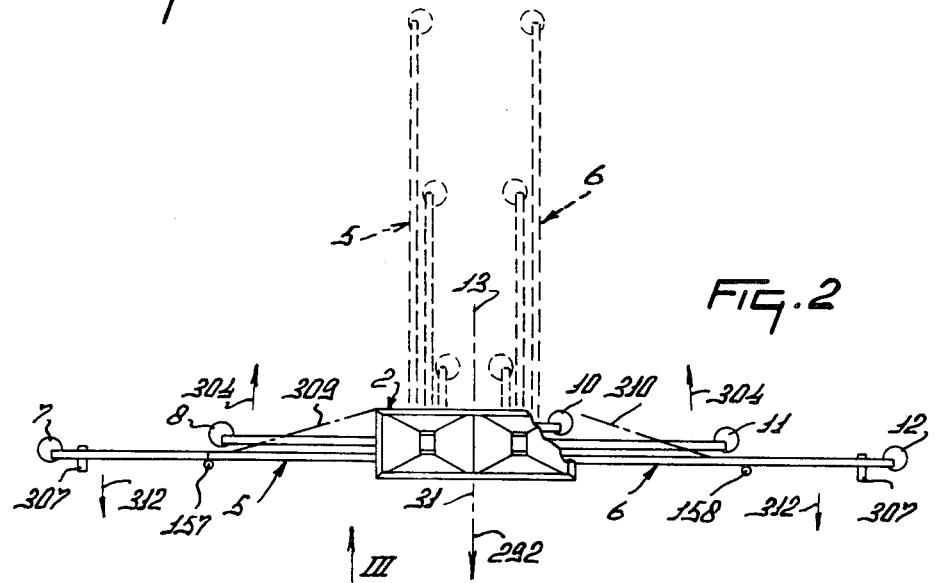
FIG. 2
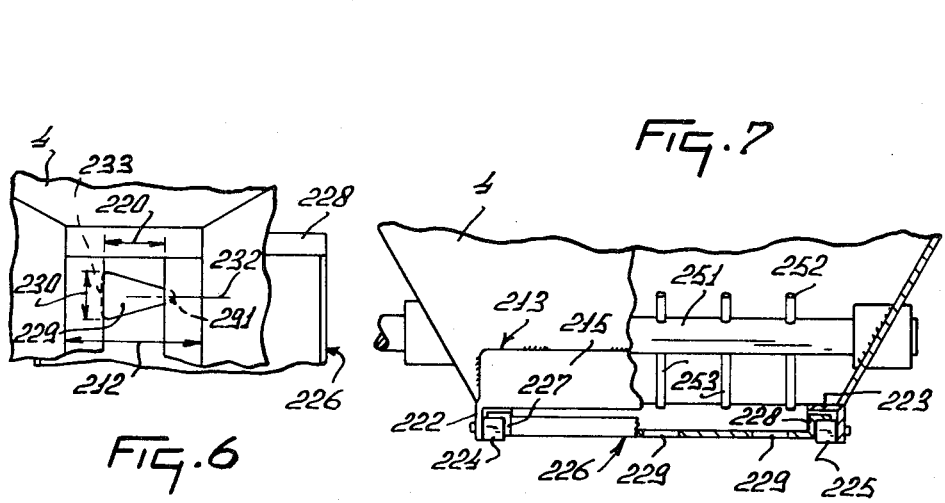
FIG. 6
FIG. 7

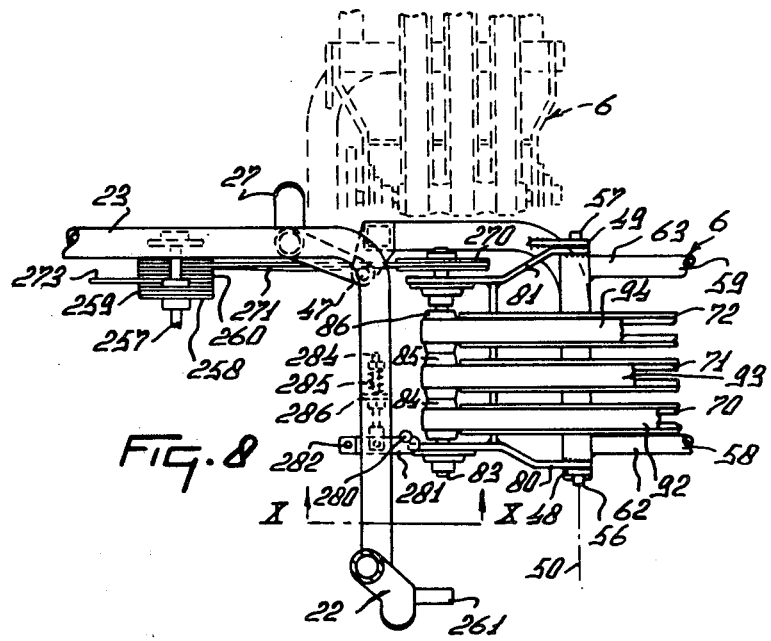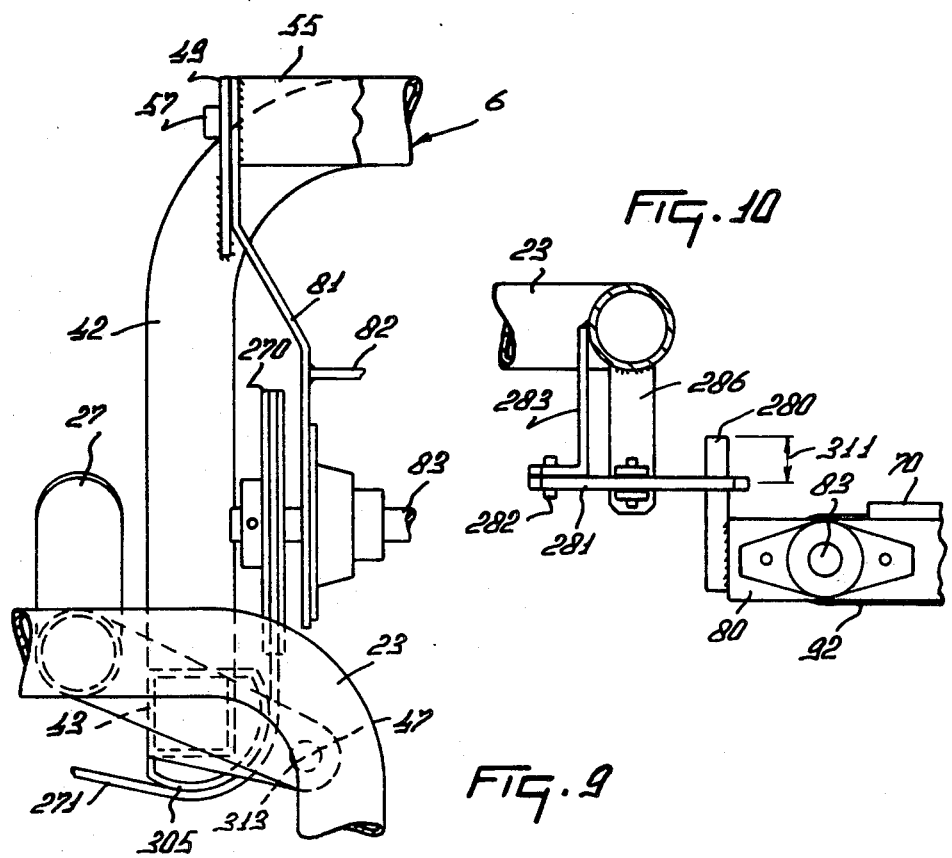

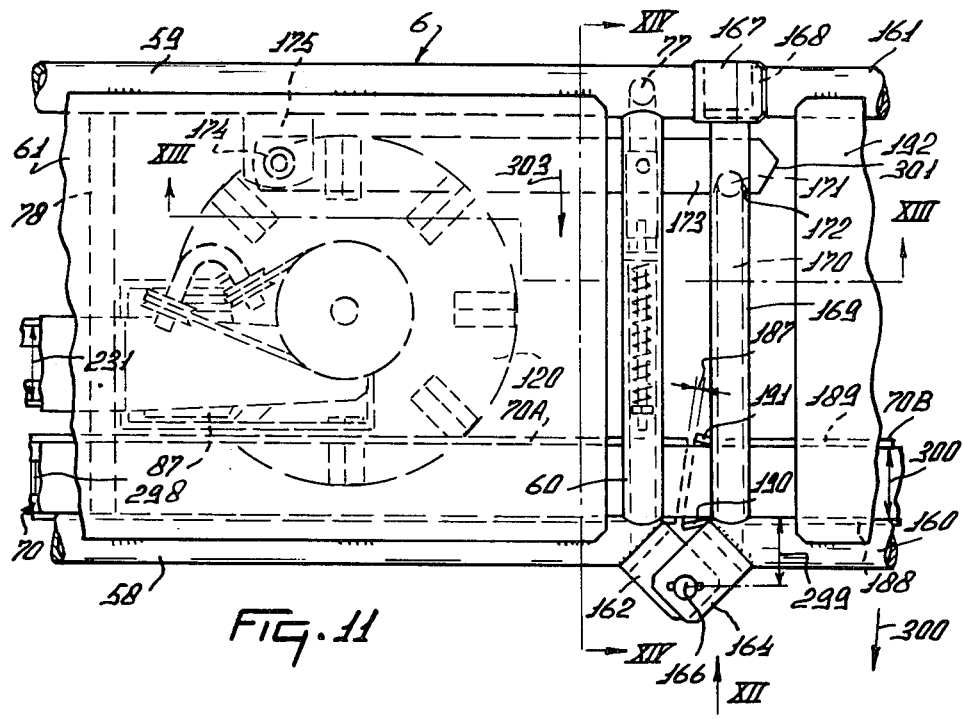
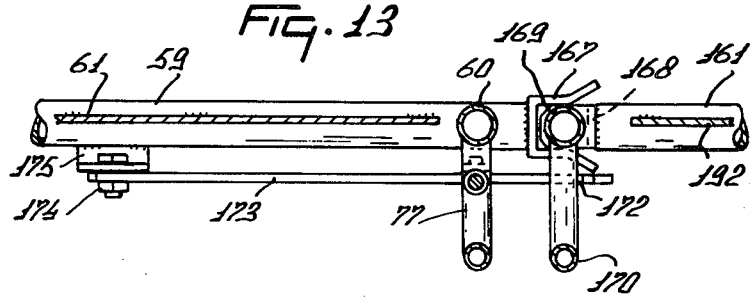
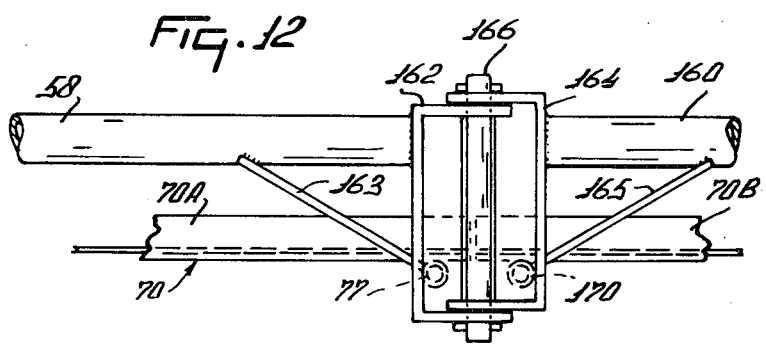

4,131,237

SPREADING IMPLEMENTS

SUMMARY OF THE INVENTION

According to the invention, there is provided a spreading implement of the kind set forth, wherein an opposite or delivery end region of the conveying member that is remote from said container outlet port is located close to a spreading member which is rotatable about a non-horizontal axis, and wherein, as seen in plan view, the center of the rotary spreading member is located to one side of an imaginary line which comprises the longitudinal center line of said conveying member.

For a better understanding of the invention, and to show how the same may be carried into effect, reference will now be made, by way of example, to the accompanying drawings, in which:

BRIEF DESCRIPTION OF THE DRAWINGS

FIG. 1 is a front elevation of a spreading implement in accordance with the invention, FIG. 2 is a plan view of the implement of FIG. 1, FIG. 6 is a plan view of a hopper outlet port of the implement as seen in the direction indicated by an arrow VI in FIG. 5, FIG. 7 is a section taken on the line VII—VII in FIG. 5, FIG. 8 is a section, to an enlarged scale, taken on the line VIII—VIII of FIG. 3, FIG. 9 is an elevation, to an enlarged scale, illustrating the hinge mounting of a spreading boom of the implement, the latter being disposed in an inoperative transport position, FIG. 10 is a section, to an enlarged scale, taken on the line X—X in FIG. 8, FIG. 11 is a plan view illustrating the pivotal mounting of the aforementioned spreading boom, FIG. 12 is an elevation as seen in the direction indicated by an arrow XII in FIG. 11, FIG. 13 is a section taken on the line XIII—XIII in FIG. 11.

DESCRIPTION OF THE PREFERRED EMBODIMENT

Figure 3:
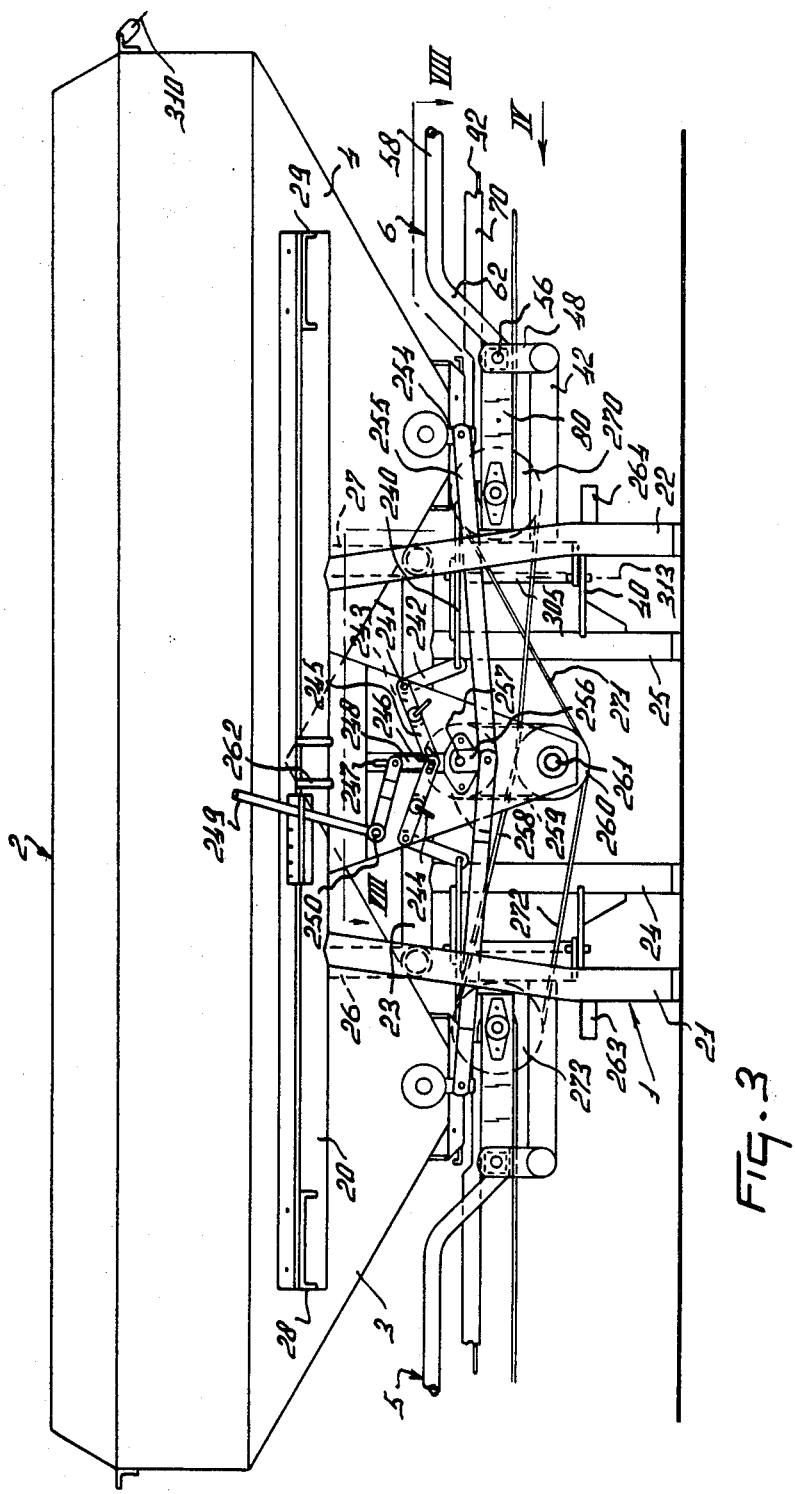
FIG. 3 is a front elevation, to an enlarged scale, of a central region of the implement of FIGS. 1 and 2 as seen in the direction indicated by an arrow III in FIG. 2.

Referring to the accompanying drawings, the spreading implement or device that is illustrated has a frame that is generally indicated by the reference 1 and a container in the form of a hopper 2 that is mounted on the frame 1. The width of the hopper 2, in a horizontal direction that is perpendicular to the longitudinal axis 13 of the implement and to the intended direction of operative travel 31 thereof, is greater than its length in said direction 31 and it will be noted from FIGS. 1 and 2, in particular, of the drawings that said hopper 2 comprises two outlet funnels 3 and 4 located at opposite sides of a substantially vertical plane containing the axis 13. The lower delivery ends of the funnels 3 and 4 open above corresponding spreading booms 5 and 6 that project laterally from the frame 1 when the implement occupies an operative position as shown in full lines in FIG. 2 of the drawings. The spreading boom 5 is provided with three spreading members 7, 8 and 9 each of which is rotatable about a corresponding upright and normally vertical or substantially vertical axis. The spreading boom 6 is provided in a substantially symmetrically identical manner with three spreading members 10, 11 and 12. It is preferred that, when the spreading booms 5 and 6 occupy their operative positions as shown in full lines in FIG. 2 of the drawings, they should extend substantially horizontally perpendicular to the direction 31 and that the axes of rotation of the spreading members 7 to 12 inclusive should all be vertical or deviate from the vertical by not more than a few degrees.

The frame 1 comprises a horizontal beam 20 (FIG. 3) to the bottom of which the upper ends of two horizontally spaced apart and symmetrically identical beams 21 and 22 are secured, said beams 21 and 22 being substantially, but not strictly, vertically disposed. A substantially horizontally disposed beam 23 of U-shaped configuration has the free ends of its two limbs rigidly secured to the rears of the two beams 21 and 22 at locations towards the upper ends of those two beams. The beams 20, 21 and 22 are located at the front of the implement with respect to the direction 31 and the limbs of the U-shaped beam 23 project rearwardly away from the beams 21 and 22 between the outlet funnels 3 and 4 of the hopper 2. Two substantially, but not strictly, vertical beams 24 and 25 have their upper ends rigidly secured to the bottom of the U-shaped beam 23 at the rear of the implement with respect to the direction 31 and thus in the "base" region of the U of the beam 23. Two beams 26 and 27 that are horizontally spaced apart from one another project upwardly and rearwardly from the rear of the U-shaped beam 23 and carry supports 30 (FIG. 4) at their upper ends, said supports 30 being mounted on a beam that is parallel to, and at substantially the same horizontal level as, the beam 20. Further supports 28 and 29 are mounted on top of the beam 20 at the opposite ends thereof. The front of the hopper 2 has a bracket by which it is secured to the supports 28 and 29 and, smilarly, the rear of the hopper has a further bracket by which is secured to the supports 30.

The frame 1, the hopper 2 and the spreading booms 5 and 6 are symmetrically identical with respect to a vertical plane containing the longitudinal axis 13 and, accordingly, it is only necessary to describe the parts that are at one side of that plane in detail. The construction and arrangement of the spreading booms 5 and 6 will therefore be described in detail only in respect of the boom 6. The frame beam 25 carries horizontally projecting lower and upper strips 40 and 41, a vertical bracket 43 (FIGS. 4 and 5) being mounted between said strips 40 and 41 and being provided with a horizontally projecting arm 42. The bracket 43 carries lower and upper horizontal lugs 44 and 45, said lugs 44 and 45 being turnably connected to the strips 40 and 41 by substantially vertically aligned lower and upper pivot pins 46 and 47. The horizontally disposed arm 42 is of substantially L-shaped configuration and the limb thereof that extends substantially parallel to the direction 31, when the implement occupies its operative position, carries two upwardly projecting lugs 48 and 49 (the lug 49 being substantially at the junction between the two limbs of the arm 42) and the spreading boom 6 is connected to said lugs 48 and 49 so as to be turnable relative thereto about a substantially horizontal axis 50 (FIG. 8). The spreading boom 6 itself comprises a substantially horizontally extending pivotable beam 55 of square cross-section (FIG. 5) that is substantially parallel to the axis 13, substantially horizontally aligned pivot pins 56 and 57 at its opposite ends connecting it turnably to the lugs 48 and 49 respectively. Beams 58 and 59 have their ends rigidly secured to the beam 55 close to the pivot pins 56 and 57 respectively, said beams 58 and 59 extending generally parallel to the lateral length of the boom 6 but comprising initial portions 62 and 63 respectively that are inclined upwardly away from the beam 55 at angles of substantially 45° to the horizontal. The remaining major portions of the beams 58 and 59 are substantially horizontally disposed and their free end regions are interconnected by a beam 60 (FIG. 11). A cover plate 61 (FIGS. 11 and 13) also rigidly interconnects the substantially horizontally disposed portions of the beams 58 and 59. The lengths of the initial inclined portions 62 and 63 of the beams 58 and 59 are such that the longitudinal axes of the major substantially horizontally disposed portions thereof are contained in a substantially horizontal plane that is spaced above the top of the beam 55 by a distance 64 (FIG. 5).

Three channel-shaped guides 70, 71 and 72 having bases which are longitudinally slotted are fastened to the beam 55 so as to extend parallel to the major portions of the beams 58 and 59, said guides 70, 71 and 72 being of different lengths that extend throughout distances 73, 74 and 75 (FIG. 1), respectively. The three distances 73, 74 and 75 are measured from a substantially vertical plane that extends parallel to the direction 31 and that contains the corresponding axis 50. However, all three of the guides 70, 71 and 72 extend from the substantially vertical plane that has just been discussed towards a further substantially vertical plane that contains the axis 13 over equal distances 76 (FIG. 5). The guide 70 comprises two portions 70A and 70B (FIG. 11), one end of the portion 70A being fastened on top of a bracket 77 (FIGS. 12 and 13) one upwardly directed end of which is secured to the beam 59 and the opposite end of which is connected to the beam 58 by a strut 163. A further bracket 78 (FIG. 11) that is identical to the bracket 77 is employed to fasten the end of the guide 71 in position. A still further bracket is used for the support of the end of the guide 72 but the bracket in question is not illustrated in the accompanying drawings. The bracket 78 supports the portion 70A of the guide 70, as well as the guide 71 and the still further bracket that is not illustrated, but which supports the guide 72, also supports both the guide 71 and the portion 70A of the guide 70. The three guides are thus supported at spaced locations lengthwise along the spreading boom 6.

Supporting strips 80 and 81 (FIG. 8) have their own ends rigidly secured to the opposite ends of the pivotable beam 55, said strips 80 and 81, which have convergent portions, being rigidly interconnected at a distance from the beam 55 by a further strip 82 (FIG. 9). The inner ends, i.e. the ends that are closest to the axis 13, of the guides 70, 71 and 72 are all secured to the further strip 82. The ends of the two strips 80 and 81 that are remote from the beam 55, and that are located beyond the further strip 82 towards the axis 13, rotatably carry a substantially horizontal shaft 83 to which are secured three pulleys 84, 85 and 86 at locations very close to the respective ends of the three guides 70, 71 and 72 and between the strips 80 and 81. Each of the three guides 70, 71 and 72 has one of three corresponding further pulleys 87 located close to the outer end thereof that is remote from the shaft 83. The further pulley 87 that corresponds to the guide 71 is illustrated in FIGS. 11, 15, 16 and 17 of the drawings. The illustrated further pulley 87 is rotatably mounted by ball bearings on an axle shaft carried by the limbs of a bracket 88, said bracket 88 being fastened to a supporting member 89 of inverted channel-shaped cross-section. The downwardly directed limbs of the supporting member 89 embrace the upwardly directed limbs 95 and 96 of the guide 71 and, moreover, the limbs of the supporting member 89 are perpendicularly interconnected, immediately above the upper edges of the guide limbs 95 and 96, by parallel but spaced apart pins 90 and 91. The pins 90 and 91 actually bear against the upper edges of the guide limbs 95 and 96. Each of the guides 70, 71 and 72 supports a corresponding one of three conveying members in the form of conveyor belts 92, 93 and 94 and the pulleys with which those belts co-operate. The belts 92, 93 and 94 pass around respective ones of the three pulleys 84, 85 and 86 and also around a corresponding one of the three pulleys 87. The arrangement is such that the upper effective run of each belt passes over the upper surface of the slotted base of the corresponding guide 70, 71 or 72, between the upright limbs 95 and 96 thereof, while the lower or return runs of the belts extend beneath the beam 55 and one, two or three of the three brackets which comprise the brackets 77, 78 and the still further bracket, not illustrated, that supports the outer end of the guide 72. The three belts 92, 93 and 94 have such lengths that the outer ends thereof are located very close to the three spreading members 10, 11 and 12, respectively. In the spreading implement which is being described, the six spreading members 7 to 12 inclusive are spaced apart from one another by substantially equal distances 100 (FIG. 1), each distance 100 preferably having a magnitude of substantially 2 meters. It is preferred that each distance 100 should not be less than substantially 1½ meters and should not be greater than substantially 3 meters. The two innermost spreading members 9 and 10 are each spaced apart from a substantially vertical plane containing the axis 13 by a distance 101 which, in this embodiment, has a magnitude of substantially 1 meter (i.e., half the magnitude of the distance 100).

Figure 15:
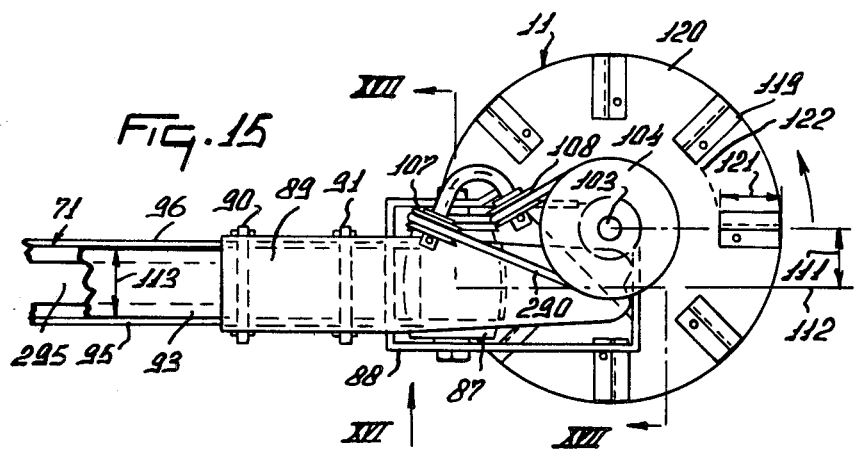
FIG. 15 is an elevation, to the same scale as FIG. 11, showing the construction and arrangement of one spreading member of the implement.
Figure 16:
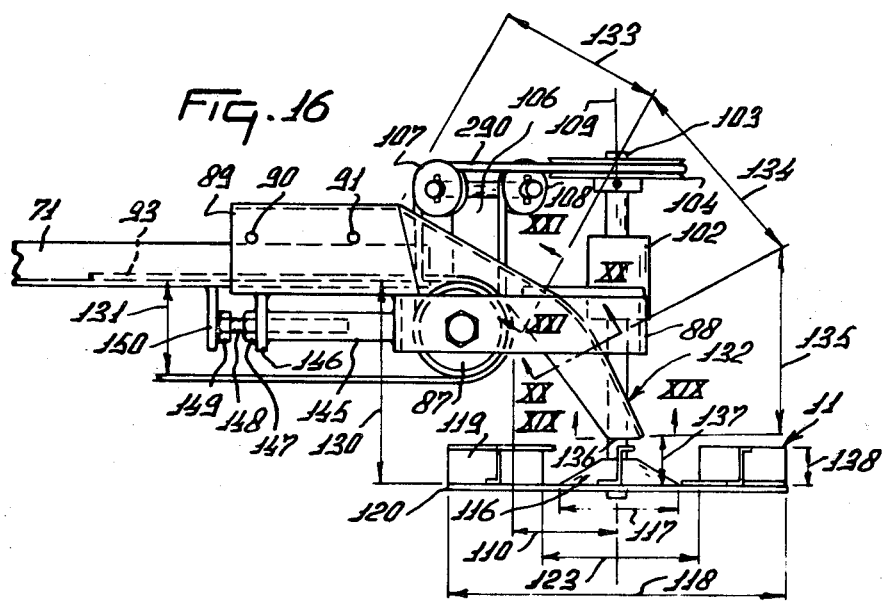
FIG. 16 is a view as seen in the direction indicated by an arrow XVI in FIG. 15.
Figure 17:
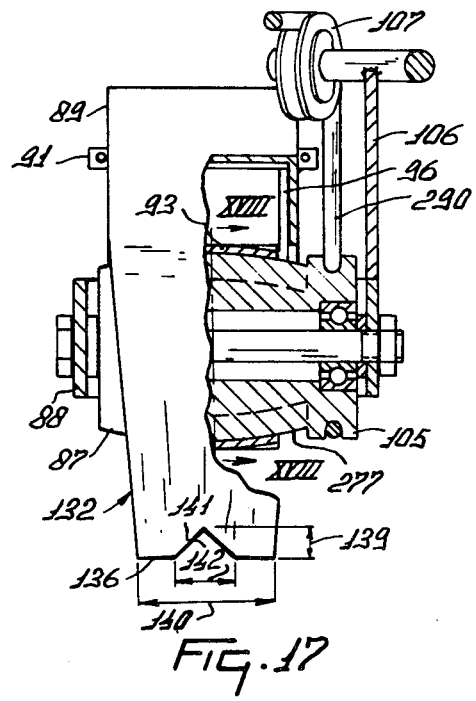
FIG. 17 is a part-sectional elevation, the section being taken on the line XVII—XVII in FIG. 15.

Each of the spreading members is connected to one of the guides by which the corresponding belt is supported and this construction and arrangement is shown in detail in FIGS. 15 and 16 of the drawings in respect of the spreading member 11 and guide 71. The bracket 88 carries a substantially vertical bearing 102 in which a similarly disposed shaft 103 is mounted so as to be rotatable about an axis 109. A pulley 104 is fastened to the upper end of the shaft 103 and one end of the barrel-shaped pulley 87 incorporates a drive pulley 105 (FIG. 17). The bracket 88 carries an upright support 106 which is provided, at its upper end, with an axle shaft upon which two relatively inclined guide pulleys 107 and 108 are rotatably mounted. An endless drive belt or rope 290 of circular cross-section passes around all four of the pulleys 104, 105, 107 and 108 to enable the substantially vertical shaft 103 to be driven from the barrel-shaped pulley 87 that is rotatable about a substantially horizontal axis. The spreading member 11 is rigidly secured to the lowermost end of the shaft 103 and, as seen in plan view, its axis of rotation (which coincides with the axis of rotation 109 for the shaft 103) is spaced at a distance 110 of the end of the conveyor belt 93 and a distance 111 (FIG. 15) from the longitudinal center line 112 of the conveyor belt 93. The distance 111 is greater in magnitude than half the width 113 of the conveyor belt 93.

The center of the spreading member 11 is formed as an upwardly tapering frusto-conical portion 116, the diameter 117 (FIG. 16) of the base of said portion 116 being substantially equal in magnitude to one-third of the overall diameter 118 of the spreading member 11. The upper surface of the spreading member 11 is provided with eight ejector blades 119 but it is noted that other numbers of the blades 119 may equally well be employed. However, it is preferred that there should not be less than four of the blades 119 and not be more than fifteen thereof. The base of the central frusto-conical portion 116 of the spreading member 11 is connected to the inner edge of a flat and substantially horizontally disposed annular portion 120 on which portion 120 the blades 119 are mounted. Each blade 119 has a length 121 measured radially with respect to the axis 103, the outer ends of the blades that are remote from that axis being contained in an imaginary right circular cylindrical surface which also contains the outer circular edge of the portion 120 of the spreading member 11. The inner ends of all of the blades 119 are contained in the surface of an imaginary right circular cylindrical figure 122 (FIG. 15) having a diameter 123 which is substantially equal in magnitude to two-thirds of the overall diameter 118 of the spreading member 11. The upper surface of the annular disc portion 120 of the member 11 is located at a vertical distance 130 (FIG. 16) beneath the lower surface of the upper run of the conveyor belt 93. The distance 130 is substantially equal to the radius of the spreading member 11 and is substantially twice the minimum distance 131 between the upper and lower runs of said belt 93.

Figure 19:
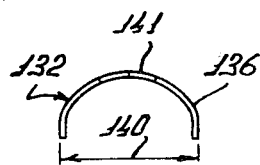
FIG. 19 is a section taken on the line XIX—XIX in FIG. 16.
Figure 20:
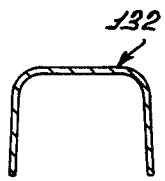
FIG. 20 is a section taken on the line XX—XX in FIG. 16.
Figure 21:
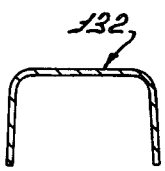
FIG. 21 is a section taken on the line XXI—XXI in FIG. 16.

A guide member that is generally indicated by the reference 132 extends between a location just above the spreading member 11 and the adjacent end of the conveying member that includes the conveyor belt 93 and the corresponding pulley 87. As seen in side elevation (FIG. 16), the guide member 132 has a first substantially straight portion 133, a central curved portion 134 and a straight free end portion 135, the latter opening out immediately above the spreading member 11. The lowermost extremity 136 of the free end portion 135 of the guide member 132 is located at a vertical distance 137 above the upper surface of the annular disc portion 120 of the spreading member 11, said distance 137 being a little greater than, but nevertheless approximately equal to, the vertical height 138 of each ejector blade 119. The first straight portion 133 of the guide member 132 is of inverted channel-shaped cross-section (see FIG. 21) and the central curved portion 134 has a similar cross-section, although of slightly smaller width (see FIG. 20). However, towards the location at which the central curved portion 134 merges into the straight free end portion 135, the central curved portion 134 progressively changes in shape so as to lose the bends interconnecting the base and the limbs (in cross-section) of the channel until the inverted shallow U-shaped configuration that is visible in FIG. 19 of the drawings is attained. The overall width 140 of the lowermost extremity 136 of the guide member portion 135 conveniently has a magnitude of substantially 45 millimeters. A V-shaped recess 141 is formed in the wall of the guide member 135 so as to extend upwardly from the lowermost extremity 136 of that portion at a location centrally across its width 140. The recess 141 has a height 139 (FIG. 17) that may conveniently be substantially 10 millimeters and a maximum width 142 of substantially 20 millimeters.

The bracket 88 has one end of a substantially horizontal tube 145 (FIG. 16) rigidly secured to it, the opposite end of said tube 145 being rigidly secured to a strip 146 welded to the lower edges of the limbs of the inverted channel-shaped supporting member 89. The strip 146 has a nut 148 fastened to it which nut receives the correspondingly screwthreaded shank of a bolt 147 that is entered through a hole in the strip 146 and axially into the tube 145. The bolt 147 has a head 149 that bears against an abutment lug 150 rigidly secured to the bottom of the guide 71 so as to depend therefrom.

Outer parts 155 and 156 of the spreading booms 5 and 6 are turnable relative to the other parts thereof about substantially vertical axes 157 and 158. This is shown in FIGS. 1 and 2 of the drawings but details of the constructions and arrangements that are involved are illustrated in FIGS. 11 to 14 of the drawings in respect of the outer part 156 and the substantially vertical axis 158. Each of the outer parts 155 and 156 has a length which is substantially equal to between substantially one-quarter and substantially one-third of the overall length of the corresponding spreading boom 5 or 6. The outer part 156 comprises substantially parallel beams 160 and 161 that are in respective rectilinear alignment with the major substantially horizontally disposed portions of the beams 58 and 59. The outermost free ends of the two beams 160 and 161 are rigidly interconnected in a manner that is not illustrated in the drawings but which is such that the interconnection is located beyond the circumference of the end spreading member 12. The end of the beam 58 carries an obliquely disposed forked bracket 162 whose base is welded to the beam 58 and whose limbs are substantially horizontally disposed. The aforementioned strut 163 (FIG. 12) obliquely interconnects the base of the bracket 162 and the beam 58 in order to strengthen the rigid connection between those parts. The neighboring end of the beam 160 is provided with a similarly shaped and similarly disposed forked bracket 164, an oblique strut 165 being provided to strengthen the rigid connection between said beam 160 and bracket 164. A substantially vertical pivot shaft 166 is entered through the overlapping upper and lower limbs of the two brackets 162 and 164 so that the outer part 156 can turn relative to the beams 58 and 59, the longitudinal axis of the shaft 156 being coincident with the diagrammatically indicated substantially vertical axis 158 (FIGS. 1 and 2).

Figure 14:
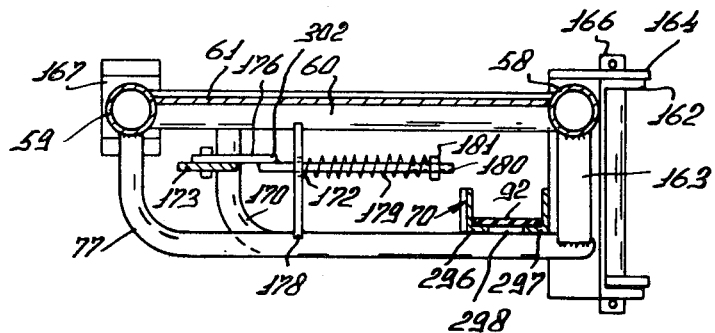
FIG. 14 is a section taken on the line XIV—XIV in FIG. 11.

The outer end of the beam 59 has the base of a forked bracket 167 welded to it, the limbs of the bracket 167 having outwardly divergent portions as can be seen best in FIG. 13 of the drawings. An angle piece 168 of L-shaped cross-section has one of its limbs secured to the end of the beam 161 and is located generally between the upper and lower limbs of the forked bracket 167. A tie beam 169 interconnects the limb of the angle piece 168 that is not directly secured to the beam 161 and the end of the beam 160 immediately adjacent to the base of the forked bracket 164. The substantially vertical end 171 of a bracket 170, that is similar to the bracket 77, has its uppermost extremity secured to the tie beam 169 towards, but spaced from, the angle piece 168. The end of the bracket 170 that is remote from its end 171 is connected by a strip or tubular member to the beam 160. The bracket end 171 affords a locking pin and fits in a recess 172 formed in one edge of a latch 173. A vertical pivot bolt 174 turnably connects the latch 173 to the substantially horizontal limb of a lug 175 that is secured to the bottom of the beam 59. A rod 176 which, as illustrated in FIG. 14, is made in two rigidly interconnected parts, has one of its ends connected to the latch 173 by a vertical pivot, said rod 176 being entered through a hole 177 in a vertical strip 178 that interconnects the beam 60 and the bracket 77. The end of the rod 176 that is remote from the latch 173 is formed as a screwthreaded portion 180 upon which a nut 181 is mounted so as to be axially displaceable along said portion 180. A helical compression spring 179 surrounds the rod 176 between the nut 181 and the margins of the hole 177 in the strip 178. Both the spring 179 and the nut 181 are thus located at the side of the strip 178 which is remote from the side thereof that faces the latch 173.

The inner end of the portion 70B of the guide 70 is fastened to the bracket 170, said portion 70B being in rectilinear alignment with the portion 70A of the same guide 70 but there being a very narrow gap 187 (FIG. 11) between the co-operating ends of the portions 70A and 70B, said gap 187 having a magnitude of not more than a very few millimeters. The guide portion 70B has opposite upright rims 188 and 189 that extend in parallel relationship except at their ends 190 and 191 which face the portion 70A. The ends 190 and 191 diverge outwardly towards the guide portion 70A and thus form a "run-in" for the belt 92 that co-operates with the guide 70. In the embodiment that is being described, the outer part 156 of the spreading boom 6 is provided with only a single conveyor belt. The beams 160 and 161 are interconnected by a substantially horizontal cover plate 192 which is substantially coplanar with, but spaced from, the cover plate 61. The spreading member 12 is arranged at the outer end of the guide portion 70B in substantially the same manner as has been described for the spreading member 11 and the guide 71. The end of the guide portion 70B that is located close to the spreading member 12 is supported at that location by a further bracket which is similar to the bracket 78.

Each of the conveyor belts, as is illustrated in respect of the conveyor belt 93 in FIG. 5, is constructed as an endless belt by interconnecting the opposite ends 196 and 197 thereof with a bolt 198. A joint is thus formed that extends substantially perpendicular to the general plane of either run of the belt, said joint having a height 199 having a magnitude which may conveniently be substantially 15 millimeters. The limbs of the channel-shaped guides 70, 71 and 72, such as the limb 96 (FIG. 5) of the guide 71, have heights 200 that preferably have magnitudes between a minimum of 40 millimeters and a maximum of 80 millimeters, the height 200 of each guide limb also preferably being equal or approximately equal to the vertical distance 201 between the upper surface of the upper run of each belt 92, 93 and 94 and an outlet port 221 formed at the bottom of the corresponding outlet funnel 4 of the hopper 2. Each of the two outlet funnels 3 and 4 is provided with a corresponding nozzle 213 which is illustrated in FIG. 5 of the drawings in respect of the funnel 4, each nozzle 213 being provided with a corresponding flow control member 226. The outlet funnel 4 has inclined downwardly convergent walls 210 and 211 whose lowermost parallel edges are spaced apart by a distance 212 (FIG. 6). The lower surfaces of the two downwardly convergent walls 210 and 211 have the corresponding nozzle 213 secured to them, said nozzle 213 having substantially vertical walls 214 and 215 that are fastened to the funnel walls 210 and 211. The lower edges of the substantially vertical walls 214 and 215 are integral with, or are fixedly secured to, substantially horizontal walls 216 and 217 respectively, the closest edges of those walls 216 and 217 being integral with, or rigidly secured to, downwardly convergent walls 218 and 219 respectively, those walls 218 and 219 extending in continuing coplanar relationship with the corresponding funnel walls 210 and 211. The mouth that is formed between the lowermost edges of the two downwardly convergent nozzle walls 218 and 219 affords the outlet port 221 which port has a width 220 (FIG. 6).

The nozzle 213 is formed at its sides with angular portions 222 and 223 (FIG. 7), said portions 222 and 223 accommodating corresponding rotatably mounted rollers 224 and 225. The rollers 224 and 225 support, from beneath, upwardly offset horizontal rims 227 and 228 of the flow control member 226. The flow control member 226 is in the form of a flat, apart from the formation of the rims 227 and 228, plate, its dimensions and arrangement being such that the upper surface of that plate gently abuts against, or is spaced with minimum clearance from, the lowermost edges of the downwardly inclined nozzle walls 218 and 219 that define the outlet port 221. The flow control member 226 is formed with a plurality (in this case, three) of generally isosceles triangular outlets 229 (FIG. 6), the base edge 233 of each outlet 229 having a width 230 that is slightly less in magnitude than the width 231 (FIG. 11) of the corresponding conveyor belt 92, 93 or 94. However, the width 230 may, if preferred, be equal to the width 231. An imaginary bisector 232 of each triangular outlet 229 intersects the apex 291 of the triangle concerned and also the mid point of the base edge 233 of that triangle. The imaginary bisector 232 is thus a line of symmetry for the outlet 229 concerned and, as seen in plan, it is disposed centrally above the corresponding underlying conveyor belt 92, 93 or 94.

The flow control member 226 is pivotally connected at one end to a rod 240 (FIG. 5), the opposite end of that rod 240 being pivotally connected to one arm of a bellcrank lever 242 (FIG. 3) that is pivotable about a substantially horizontal pin 241. A second arm 243 of the lever 242 is disposed alongside a longer arm 245 that is turnable freely about the pivot pin 241 but that can be retained in register with the lever arm 243 by engaging a locking bolt 244. The end of the longer arm 245 which is remote from the pin 241 is formed with a longitudinal slot 247 and a pin 246 is entered through said slot 247 to connect the arm 245 to an upwardly and downwardly displaceable coupling 248. The upper end of the coupling 248 is pivotally connected by a pin to one arm of a control lever 249 that is turnable about a horizontal pivotal pin 250. As can be seen in FIG. 3 of the drawings, the upper manually movable arm of the control lever 249 is entered through a slot in a guide member, said guide member being provided with a scale.

A lower region of the interior of the outlet funnel 4 contains an agitator 251 (FIG. 7) that is constructed and arranged to prevent or minimize caking and bridging of powdered and granular materials contained within the hopper 2 during the use of the implement. The agitator 251 has a row of short upwardly directed pins 252 and a row of longer and downwardly directed pins 253. The pins 252 and 253 are all secured to a central rockable shaft, the ends of which are journalled in substantially horizontally aligned bearings carried by the front and rear walls of the funnel 4. The central shaft projects outwardly of the funnel 4 through the front bearing and there carries a short downwardly directed arm 254 (FIG. 3). The free end of the arm 254 is pivotally connected to one end of a long coupling rod 255 whose opposite end, in turn, is pivotally connected to a short crank arm 256 mounted on a substantially horizontal rotary shaft 257. The shaft 257 also carries a pulley 258 which is in driven connection with a further pulley 260 by way of an endless belt or rope 259. The further pulley 260 is fastened to a substantially horizontal driving shaft 261 that is located substantially centrally across the width of the implement. The leading end of the driving shaft 261 is splined or otherwise keyed (see FIG. 4) and is intended to be placed in driven connection with the power take-off shaft of an agricultural tractor or other operating vehicle by way of an intermediate telescopic transmission shaft (not shown) which is of a construction that is known per se and which has universal joints at its opposite ends. The implement is also provided with coupling means to enable it to be connected to the three-point lifting device or hitch at the rear of an agricultural tractor or other operating vehicle and said coupling means comprises forwardly projecting apertured lugs 262 for pivotal co-operation with the free end of the upper adjustable lifting link of such a device and lower horizontally aligned pins 263 and 264 that are carried by the beams 21 and 22 respectively, said pins 263 and 264 being intended for co-operation with the lower lifting links of a device of the kind in question.

Figure 18:
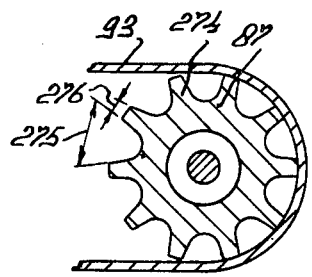
FIG. 18 is a section taken on the line XVIII—XVIII in FIG. 17.

The shaft 83 (FIGS. 8, 9 and 10) is provided at one end with a drive pulley 270 and an endless belt or rope 271 of circular cross-section places said pulley 270 in driven connection with the pulley 260, which is a multiple pulley. It will be noticed from FIG. 3 of the drawings that the belt or rope 271 is arranged with its two runs in crossing relationship so that the direction of rotation of the shaft 83 will be opposite to that of the driving shaft 261. The multiple pulley 260 also transmits drive to a pulley 273 carried at one end of a shaft which corresponds to the shaft 83 but which is associated with the spreading boom 5 instead of the spreading boom 6. The drive is transmitted by an endless belt or rope 272 and it will be noticed from FIG. 3 of the drawings that the two runs of that belt or rope 272 are not in crossing relationship as a result of which the shaft 83 and the corresponding shaft which is associated with the spreading boom 5 will rotate in opposite directions during the use of the implement. The generally barrel-shaped pulleys 84, 85, 86 and 87 around which the conveyor belts 92, 93 and 94 are actually guided have milled or toothed peripheries as is illustrated in FIG. 18 of the drawings in respect of the pulley 87 which guides the belt 93. The construction is such that, at its circumference, the pulley 87 has a plurality of ridges 274 of which it is preferred, but is not essential, that there should be ten in number. It is also preferred that, as illustrated, the gaps 275 between the successive ridges 274 should be significantly greater in angular extent around the corresponding axis of rotation than are the widths 276 of the ridges 274 themselves measured in the same way. Each of the pulleys 84, 85, 86 and 87 is of the same basic construction, their "barrel" shapes exhibiting an outwardly convex cylindrical surface 277 from one effective axial end thereof to the other.

The supporting strip 80 (FIGS. 8 and 10) is provided at the end thereof which is remote from the beam 55 with a locking pin 280. The locking pin 280 cooperates with a latch 281 that is pivotally connected by a pin 282 to a lug 283 depending from the U-shaped frame beam 23. The latch 281 us urged into retaining engagement with the locking pin 280 by a helical compression spring 285 arranged around a screwthreaded portion of a rod 284 between an adjustable nut disposed on that portion and the margins of a hole in a strip 286 which depends from the beam 23, said rod 284 being entered through that hole. A fork provided at the end of the rod 284 engages the latch 281, by way of a substantially vertical pivot pin, at a location spaced from the pivot pin 282.

When the implement is to be used, it is connected to the three-point lifting device or hitch of an agricultural tractor or other operating vehicle by employing the apertured lugs 262 and the substantially horizontally aligned pins 263 and 264. The leading splined or otherwise keyed end of the driving shaft 261 is placed in driven connection with the power takeoff shaft of the same agricultural tractor or other vehicle employing a known transmission shaft (not shown) of the kind referred to above. The implement serves for spreading powdered or granular materials over the soil and is particularly, but not exclusively, suitable for spreading powdered and granular artificial fertilizers, seeds and the like in operations on agricultural land. A supply of the material that is to be spread is loaded into the hopper 2 and the spreading booms 5 and 6 are placed in the operative positions thereof which are illustrated in full lines in FIG. 2 of the drawings. Upon driving the shaft 261, the multiple pulley 260 transmits rotation to the driving pulleys 270 and 273 that are associated with the corresponding booms 6 and 5 respectively. Referring to the operation of the boom 6, the operation of the boom 5 being substantially symmetrically identical, the pulley 270 drives the shaft 83 which carries the generally barrel-shaped pulleys 84, 85 and 86 and those pulleys, in turn, cause the belts 92, 93 and 94 to move therearound in such a way that their upper effective runs travel in directions towards the laterally outermost end of the boom 6. Each of the belts 92, 93 and 94 drives a corresponding one of the pulleys 87 and, as has been described with reference to FIGS. 15 to 18 of the drawings in respect of the belt 93, the drive pulley 105 which is integral with, or rigidly secured to, the corresponding pulley 87, transmits rotary drive to the spreading member 11 by way of the drive belt or rope 290, the shaft 103, the pulley 104 and the guide pulleys 107 and 108.

Rotary drive is transmitted to all of the other spreading members from the corresponding pulleys 87 in a generally similar manner.

The powdered or granular material that is to be spread passes to the receiving ends of the belts 92, 93 and 94 of the spreading boom 6 by way of the outlet port 221 of the funnel 4 and the outlets 229 in the flow control member 226. The conveyor belts 92, 93 and 94 then carry the material which they receive to the corresponding rotating spreading members 10, 11 and 12. The corresponding parts associated with the spreading boom 5 operate in a substantially symmetrically identical manner. Manual operation of the control lever 249 causes the flow control member 226 to be displaced to either the left or the right as seen in FIGS. 5 and 6 of the drawings. A symmetrically similar displacement of the flow control member associated with the boom 5 also takes place. The flow control members 226 will initially occupy positions in which the outlets 229 are completely out of register with the corresponding outlet ports 221 so that no material will be delivered until displacement of the members 226 to bring the outlets 229 into complete or partial register with the ports 221 is effected. Once such a situation has been brought about by appropriate manipulation of the control lever 249, material falls through the outlets 229 and onto the upper runs of the belts 92, 93 and 94. Those belts then convey the material towards the outer ends of the guides 70, 71 and 72 and, when those ends are reached, the material is discharged from the belts at substantially the velocity of the belts themselves. The material is thus thrown into the corresponding guide members, such as the guide member 132 (FIGS. 15 to 17). The moving material arrives at the central curved portion 134 of each guide member which deflects its direction of progress downwardly so that it passes, via the corresponding straight free end portion 135, beyond the lowermost extremity 136 and onto the corresponding spreading member, such as the spreading member 11. Some of the material falls onto the central frusto-conical portion 116 while the remainder falls onto the flat annular portion 120. The quantity of material per unit time which reaches each spreading member from the hopper 2 is adjusted, as may be required, by appropriate manipulation of the flow control members 226 from the lever 249. Such adjustments change the positions of the outlets 229 relative to the ports 221, a minimum quantity of material per unit time being supplied when only the apices 291 of the generally triangular outlets 229 are in register with the ports 221 and the maximum possible quantity of material per unit time being supplied when said outlets are completely in register with said ports. The triangular shapes of the outlets 229 are conducive to the avoidance of blockages when only small volumes of material per unit time are to be spread.

Figure 4:
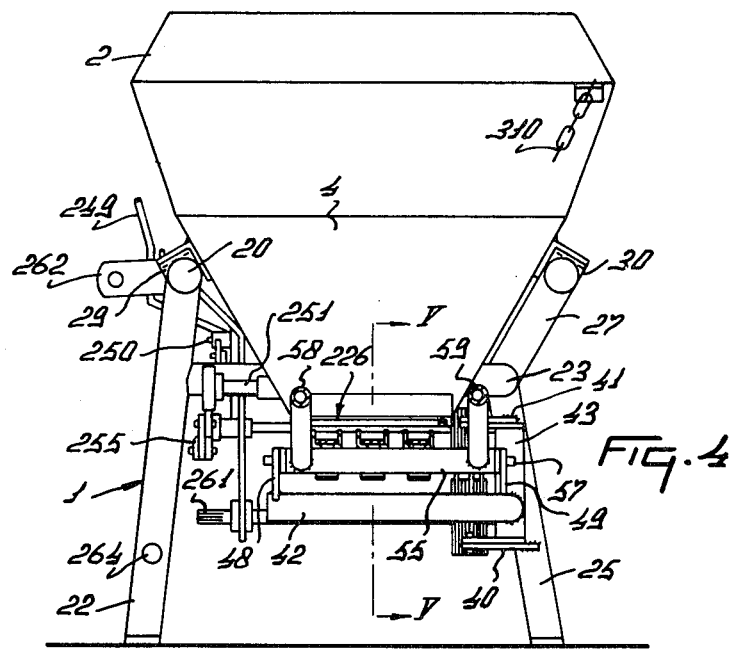
FIG. 4 is a side elevation as seen in the direction indicated by an arrow IV in FIG. 3.
Figure 5:
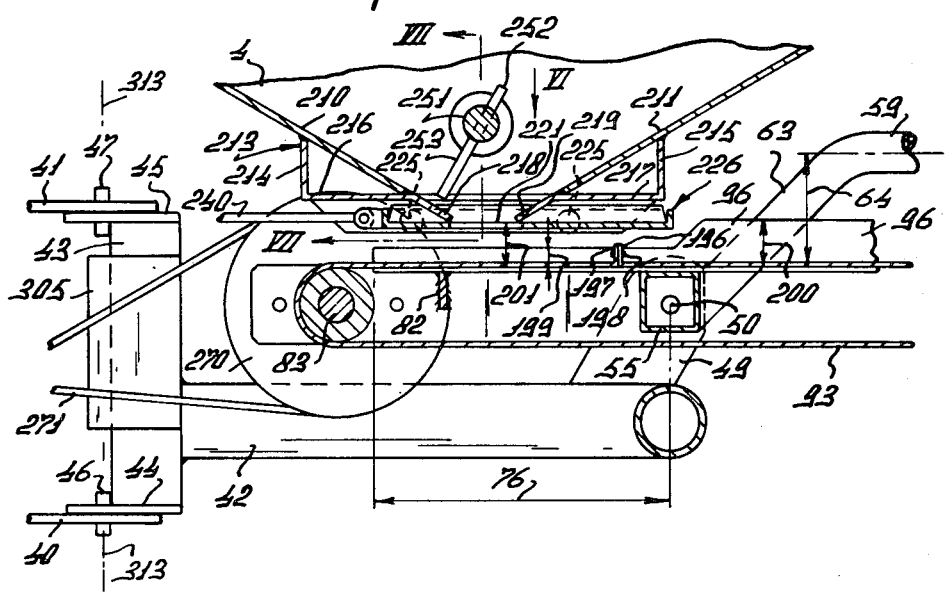
FIG. 5 is a section, to an enlarged scale, taken on the line V—V in FIG. 4.

As is illustrated in respect of the spreading member 11 in FIGS. 15 and 16 of the drawings, the center (axis of rotation 109) of each spreading member is disposed at that side of an imaginary straight line which comprises the longitudinal center line 112 of the corresponding conveyor belt that is located at the rear thereof relative to the side (front) of the implement which is arranged for connection to an operating agricultural tractor or other vehicle (i.e. the front of the implement is the left-hand side thereof as seen in FIG. 4 of the drawings). Thus, in this embodiment, the center of each spreading member is located rearwardly of the longitudinal center line 112 of the corresponding belt with respect to the intended direction of operative travel 31 (FIG. 2) of the implement. The material from the belts actually falls onto the spreading members in front of the axes of rotation of those members with respect to the direction 31 so that the material is ejected rearwardly from those members. The guide members 132 are shaped with a view to any material, irrespective of its nature, arriving on the spreading members 7 to 12 in such a way that those spreading members will eject any such material in substantially the same way. The shape of the guide members 132, and particularly the cross-sectional shape, is such that material is delivered to the spreading members so that it will be ejected rearwardly by those members in patterns which are substantially symmetrical to substantially vertical planes that are parallel to the direction 31 and that contain the axes of rotation 109 of the spreading members concerned. When relatively large volumes of material per unit time are to be spread, the V-shaped recess 141 (FIGS. 17 and 19) at the end of each guide member becomes important. The recesses 141 influence the feeding of the material to the corresponding spreading members in such a way that, irrespective of the nature of the material, quite large volumes thereof per unit time are still spread rearwardly in a substantially symmetrical manner with respect to substantially vertical planes that extend in the direction 31 and that contain the corresponding axes of rotation 109.

Since the drive transmission to the spreading members is located at a higher level than the conveyor belts 92, 93 and 94, said transmission is not soiled by the material that is to be distributed to any significant extent. The particular form of the device transmission which has been described, and that is illustrated in the accompanying drawings, is thus not dependent to any significant extent upon the way in which the material is actually fed to the spreading members. Since the spreading members are indirectly driven from the conveyor belts, their speed of rotation is proportional to the speed of linear movement of the belts so that the belts and the spreading members will always operate at the correct relative speeds. The tension of the conveyor belts 92, 93 and 94 is maintained at the correct value by turning the bolts 147 (see FIG. 16 in respect of the belt 93) relative to the nuts 148 to increase marginally, or decrease marginally, the distance between the pulley 87 and the corresponding pulley 84, 85 or 86. The correct location of each spreading member relative to the outer end of the corresponding conveyor belt is always maintained because the corresponding pulley 87 occupies a bodily fixed position relative to the associated spreading member, both of them being mounted in the bracket 88 concerned and said bracket 88 being carried by the corresponding inverted channel-shaped supporting member 89 that is slidable along the outer end of the associated guide 70, 71 or 72.

The material that is transported along the conveyor belts 92, 93 and 94 is effectively prevented from falling off those belts before it reaches the outer ends of the upper runs thereof by the upright limbs of the corresponding guides 70, 71 and 72, for example the limbs 95 and 96 of the channel-shaped guide 71. Any small quantities of material that do find their way beneath the upper runs of the conveyor belts 92, 93 and 94 do not accumulate in the bottoms of the guides 70, 71 and 72 to any significant extent because the webs or bases of those guides are, as previously mentioned, of longitudinally slotted formation. Reference is made to FIG. 14 of the drawings which illustrates the guide 70 and from which it can be seen that said guide conveniently comprises two symmetrically juxtaposed angle members 296 and 297 that are both of L-shaped cross-section, a longitudinal slot 298 being formed between their spaced apart lower substantially horizontal limbs. This formation of each guide is not, however, essential and the guides may be formed unitarily in which case their bottoms have a plurality of more or less regularly spaced apart slots or other holes. The angle member construction is generally preferred because said members 296 and 297 only need to be connected to one another at intervals by small bars or the like to provide efficient but light weight guides that will not retain the material that is to be spread in any significant quantities and certainly not to an extent that will interfere with the efficient operation of the implement.

Uniform delivery of material from the hopper 2 is improved by the operation of the agitator 251 in the outlet funnel 4 and by the operation of the similar agitator in the outlet funnel 3. When the implement is in use, the agitator 251 rocks or oscillates about the longitudinal axis of its central shaft as the long coupling rod 255 translates rotation of the short crank arm 256 into oscillation of the arm 254. The agitator located in the outlet funnel 3 is also connected to the short crank arm 256 and operates in a similar manner (see FIG. 3). As will be apparent from the description given above and from the accompanying drawings, the outlet funnel 3 is provided with a flow control member that is substantially symmetrically identical to the flow control member 226 associated with the outlet funnel 4. Both flow control members are connected to the control lever 249 in a substantially symmetrically identical manner with respect to a substantially vertical plane that contains the longitudinal axis of the driving shaft 261 and that extends in the direction 31. However, instead of both of the flow control members being in operative connection with the control lever 249, either one, or the other, or both of them can be effectively disconnected from that control lever by disengaging the corresponding locking bolt 244, or both of those locking bolts. After such disengagement of one of the bolts 244, the corresponding second arm 243 is no longer secured to the neighboring longer arm 245. Thus, since the arm 245 is freely turnable on the pivot pin 241 concerned, movement of the control lever 249 will not alter the position of the corresponding flow control member 246 once the intervening locking bolt 244 is disengaged. If, for example, material is to be spread at substantially only one side of the longitudinal axis 13, the lever 249 is first operated, with both bolts 244 engaged, to close all of the outlets 229 whereafter the bolt 244 at the side of the axis 13 where no material is to be spread is disengaged with the result that, subsequently, operation of the lever 249 will affect only the flow control member 226 associated with the spreading boom 5 or 6 that is to spread material.

It has previously been noted that each joint or junction between the opposite ends 196 and 197 (FIG. 5) of each conveyor belt projects upwardly above the upper surface (when in the upper run of the belt concerned) of the belt by the distance 199 and it is noted that this joint or junction has an advantageous cleaning effect upon the upright limbs (for example, the limbs 96 and 97) because the opposite edges of the joint or junction act as a scraper for those limbs. Thus, the use of the simple joint or junctions that employ the bolts 198 is desirable in the present implement in preference to more sophisticated joints or junctions that do not involve portions projecting from the general planes of the belt runs.

As seen in plan view (FIG. 8), the beams, such as the beams 58, 59, 160 and 161, of the spreading boom supporting structures or frames are located at opposite sides of the conveying members that comprise the conveyor belts 92, 93 and 94. The beams in question thus afford protection to the conveying members of the booms 5 and 6 in the event of a collision with a tree, shrub or other upright obstacle during a spreading operation. The outer parts 155 and 156 of the spreading booms 5 and 6 are capable, as is illustrated in FIGS. 11 to 14 of the drawings, of turning pivotably relative to the other inner parts of those booms. Each pivotal axis, such as the one that is afforded by the substantially vertical pivotal shaft 166, is located at a short distance from the corresponding conveyor belt that is disposed in the pivotable outer part concerned, i.e., in the case of the shaft 166, from the belt 92. In the embodiment which is being described, the shaft 166 is located at a distance 299 (FIG. 11) from the conveyor belt 92, said distance 299 being smaller than the width 113 (FIGS. 11 and 15) of each belt. Considered with respect to the direction 292, the shaft 166 is located at the front of the implement and of the spreading boom concerned. The outer part 156, and similarly the outer part 155, can turn forwardly about the axis of the pivotal shaft 166 when a potentially damaging force acts on said part in a forward direction. The part concerned will yield forwardly before damage occurs and this safety factor is advantageous in effect when obstacles are met with during maneuvering of the implement. When, for example, the outer part 156 of the spreading boom 6 is maneuvered rearwardly into contact with an obstacle, that part will turn forwardly about the pivotal shaft 166 in the direction 312 (FIGS. 2 and 11) once the torque exerted upon said outer part is sufficient to compress the spring 179 so far that the recess 172 in the angularly displaced latch 173 can lose contact with the end 171 of the bracket 170 that affords a locking pin. The torque that is required to effect disengagement can be increased or decreased by an appropriate adjustment of the nut 181 axially along the screwthreaded portion 180 of the rod 176. If the outer part 156, for example, has been displaced forwardly in the direction 312 by collision with an obstacle, it can readily be brought back to its appointed operative position by turning its manually back about the shaft 166 in a direction opposite to the direction 312. The spring 179 will have turned the latch 173 in the direction 303 that is indicated in FIG. 11 of the drawings but not beyond abutment of the leading edge (in the direction 303) of said latch with a stop 302 (FIG. 14) afforded by the end of one of the parts of the preferably two-part rod 176. If the rod is formed as a single part, the stop 302 may be provided in the form of a downward projection. Accordingly, the end 171 of the bracket 170 will, during its return in a direction opposite to the direction 312, contact an inclined end surface 301 of the latch 173, continued return movement in a direction opposite to the direction 312 causing the latch 173 to be turned through a few degrees in an counter clockwise direction about its pivot bolt 174 as seen in FIG. 11 of the drawings until said bracket end 171 can re-enter the recess 172 and re-establish the correct operative position of the outer portion 156 of the spreading boom 6. The stop 302 ensures that the bracket end 171 will always contact the inclined end surface 301 of the latch 173 during restoration of the correct operative position of the outer part 156 of the boom 6, the latch 173 subsequently being displaced in a direction opposite to the direction 303 against the action of the spring 179 until the part 171 snaps back into the recess 172. When displacement of, for example, the outer part 156 takes place about the pivotal shaft 166 relative to the remainder of the spreading boom 6, the two portions 70A and 70B of the corresponding guide 70 are moved farther away from one another and some twisting and stretching of the corresponding belt 92 results. The belt 92 is, however, of at least partially elastomeric construction and will accommodate the stretching that takes place without permanent deformation. The belt 92 will often return to its correct operative position without attention when the outer part 156 is swung back into the position thereof that is illustrated in FIG. 11 of the drawings in a direction opposite to the direction 312 but, if necessary, the portion of the belt 92 that is in the region of the gap 187 can readily be returned to its correct disposition by hand.

The whole of each of the two spreading booms 5 and 6 can be turned rearwardly with respect to the frame 1 in a direction 304 (FIG. 2) to bring the implement to an inoperative transport position which is shown in broken lines, in respect of the booms 5 and 6, in FIG. 2. It will be self-evident from the drawings that the overall width of the implement in a horizontal direction perpendicular to the direction 31 is very greatly reduced in the inoperative transport position of the implement as compared with the width thereof in the operative position of the implement that is illustrated in full lines. The implement is brought from its operative position to its inoperative position by pushing each of the two booms 5 and 6 rearwardly in the direction 304 until, in this case of the boom 6, the applied force is sufficient to compress the spring 285 to such an extent that the pin 280 can ride out of its co-operating recess or notch in the latch 281. Once this has occurred, the whole boom 6 can turn rearwardly in the direction 304 about a substantially vertical axis 313 (FIG. 9) that is afforded by the aligned pivot pins 46 and 47 (FIGS. 5, 8 and 9). Once the latch 281 is disengaged, it is a simple matter to run the boom 6 rearwardly about the axis 313 into the inoperative transport position thereof that is illustrated in broken lines in FIG. 2. Obviously, the boom 5 is dealt with in a symmetrically identical manner. It will be noted that displacement of the boom 6 about the axis 313 brings the drive pulley 270 and the co-operating portion of the multiple pulley 260 out of substantially coplanar relationship but the position of the axis 313 (FIG. 9) relative to said pulleys 260 and 270 is such that, when the boom 6 has been fully displaced rearwardly as shown in FIG. 9 of the drawings, the belt or rope 271 is slackened to such an extent that it will no longer transmit drive from the pulley 260 to the pulley 270 but is not slackened so much that it will fall off those pulleys. In order to ensure the condition that has just been described, an abutment guide 305 (FIGS. 5 and 9) is provided, said guide being secured to the bracket 43. The guide 305 is, of course, located close to the axis 313. The arrangement that has just been described has the advantage that turning the boom 6 into its inoperative transport position (or the boom 5 in a symmetrically identical manner) automatically disconnects the drive transmission to the corresponding shaft 83. Conversely, upon moving either boom back into its operative position, the corresponding drive transmission is automatically re-established. The implement may, of course, be used with only one of its spreading booms 5 and 6 turned rearwardly into the inoperative transport position that is illustrated in broken lines in FIG. 2 of the drawings and also in broken lines in FIG. 8 in respect of the boom 6. The other boom will remain in its operative position and, under these circumstances, the flow control member 226 that corresponds to the inoperative boom will be placed in its "closed" position as described above, the corresponding locking bolt 244 being disconnected so that the control lever 249 is effective only in respect of the flow control member 226 that corresponds to the boom that is to be used.

It will be realized that either spreading boom 5 or 6 can also yield rearwardly in the direction 304 if, for example, that boom should collide with a tree, bush, post or other upright obstacle. As soon as the force that blocks progress in the direction 31 overcomes the corresponding spring 285, the latch 281 concerned will lose contact with the corresponding locking pin 280 and the boom 5 or 6 in question will turn rearwardly. The force which must be exerted before release of either latch 281 takes place can be increased or decreased by an appropriate adjustment of the nut that can be seen in FIG. 8 of the drawings lengthwise along a screwthreaded portion of the rod 284 upon which that nut is mounted. It is not essential that the axis that is defined by the pins 46 and 47 should be strictly vertical and, if preferred, it may be inclined to the vertical in such a way as to be contained in a substantially vertical plane that is substantially parallel to the direction 31, the upper pin 47 being more advanced in the direction 31 than is the lower pin 46. With such a construction, the boom 6 will also move upwardly when it is turned rearwardly about the axis 313. This is useful in automatically re-establishing the operative position of the boom concerned after a collision with an obstacle because, if such collision causes rearward displacement through only a few degrees, the weight of the displaced boom will often be sufficient to cause it automatically to turn back about the oblique axis 313 and re-establish the operative position. An oblique disposition of each of the two axes 313 can also be an advantage in the inoperative transport position of the implement because, with such a construction, the booms 5 and 6 will then be inclined upwardly to some extent in a general direction opposite to the direction 31. The ridges 274 (FIG. 18) on the pulleys 84, 85, 86 and 87 minimize slipping of the belts 92, 93 and 94 and also tend to prevent the adhesion, for any length of time, of material to the rear surfaces of the belts that repeatedly come into contact with the pulleys. The cover plates 61 and 192 that extend between the beams 58/59 and 160/161 respectively protect the upper effective runs of the belts 92, 93 and 94 against adverse weather conditions throughout all, or substantially all, of the length of each belt.

Each of the booms 5 and 6 is capable of turning upwardly and downwardly, during the operation of the implement, about a corresponding substantially horizontal axis that extends substantially parallel to the direction 31. The axis concerned in the case of the boom 6 is the axis 50 that is illustrated in FIGS. 5 and 8 of the drawings. The substantially horizontally aligned pins 56 and 57 effectively define the axis 50 and the whole boom 6 can turn upwardly and downwardly about that axis relative to the arm 42. However, in order to prevent either boom from turning so far downwardly that at least its outermost spreading member 7 or 12 would contact the ground surface, the outer part 155 and 156 of each boom is provided with a corresponding foot 307 (FIGS. 1 and 2) and said feet 307 positively prevent such circumstances occurring and can be employed in supporting the booms 5 and 6 in stable positions above the ground surface when the implement is not actually in use. In addition, chains 309 and 310 interconnect side regions of the top of the hopper 2 and the corresponding booms 5 and 6, at locations approximately midway along the lengths of those booms, and prevent the booms from turning downwardly about the corresponding axes 50 when the chains concerned are fully extended. It is important that the booms should be able to deflect upwardly about substantially horizontal axes with respect to the frame 1 to avoid damage in the event of, for example, the wheels of the agricultural tractor or other operating vehicle entering ruts or other holes in the ground. In order that the booms shall be able to turn upwardly without losing the coupling between each locking pin 280 and the corresponding latch 281, each pin 280 projects by a distance 311 (FIG. 10) above the level of the latch 281 concerned. The latches 281 thus maintain their engagement with the pins 280 because of the relative vertical displacement between those parts that is possible.

Each of the six spreading members 5 to 12 provided in the embodiment being described produces such a distribution pattern of material during the use of the implement that the strips of ground which are supplied with material by each member and which extend parallel to the direction 31 overlap one another to produce, in effect, a single broad strip of treated soil. The amount of material that is received by each unit area of soil across the width of the strip is substantially uniform except, perhaps, at the extreme margins of the broad strip and this can, of course, be compensated for merely by overlapping successive traverses of a field or the like to a small extent. The shapes of the spreading members 7 to 12 and those of the guide members 132 are chosen so that each spreading member will produce a generally triangular distribution pattern, the width of the base of the triangle substantially corresponding to the distance between the two spreading members that are the immediate neighbors at opposite sides of the spreading member under consideration. A maximum of six spreading members has been found to be advantageous in an implement, such as the one which has been described above and is illustrated in the accompanying drawings, such implement having an overall spreading width of substantially 12 meters. The distribution width of each individual spreading member is preferably not less than 3 meters and, in the described and illustrated implement, said width is substantially 4 meters. However, because of the overlap between the neighboring spreading members, the effective distribution width of each of them is substantially 2 meters which produces a very effective result. The diameter 118 of each of the spreading members 7 to 12 preferably has a magnitude of substantially 230 millimeters and the length 121 of each ejector blade 119 is preferably substantially 50 millimeters. Spreading members that have substantially these dimensions can conveniently be made from synthetic plastics materials. As previously mentioned, each spreading member preferably comprises eight of the blades 119 and it is preferred that there should not be less than four nor more than fifteen of those blades per spreading member. In oreder for the material that is to be spread to reach the upper runs of the conveyor belts 92, 93 and 94 correctly from the outlets 229 and to be ejected from those belts into the guide members 132 at the correct velocity, the speed of travel of the belts should not be less than half a meter per second and should not be greater than two meters per second. The preferred speed of travel is 1.3 meters per second.

In order that each spreading member should distribute material throughout a strip of land of the desired width during the operation of the implement, and in order to obtain the desired distribution pattern of the material, irrespective of its nature, it is advantageous that each ejector blade 119 should occupy a trailing position from its radially innermost end to its radially outermost end with respect to the intended direction of rotation of the corresponding spreading member. In an advantageous construction of this kind, the radially outermost end of each blade 119 is substantially 5 millimeters to the rear, with respect to said direction of rotation, from an imaginary radial line that intersects the inner end of that blade.

Each of the generally barrel-shaped pulleys 84, 85 and 86 that is positively rotated to drive the corresponding conveyor belt preferably has a maximum diameter of not more than 200 millimeters and the similarly shaped further pulleys 87 that are driven only by the movement of the belts therearound preferably have diameters of not more than 120 millimeters. In the described and illustrated implement, the maximum diameters of all of the pulleys 84, 85, 86 and 87 are equal and have a magnitude of substantially 60 millimeters. The widths 113 (FIGS. 11 and 15) of the conveyor belts are preferably not greater than 100 millimeters and a width of substantially 50 millimeters has been found to give a very effective result. In order to ensure correct feeding of material from the hopper to the receiving end regions of the conveyor belts 92, 93 and 94, it is desirable that the distance 201 (FIG. 5) between the outlet port 221 of each funnel 3 and 4 and the upper runs of the corresponding belts should not be greater than 30 millimeters.

Although various features of the spreading implement which has been described, and is illustrated in the accompanying drawings, will be set forth in the following claims as inventive features, it is emphasized that the invention is not necessarily limited to those features and include within its scope each of the parts of the spreading implement described, or illustrated in the accompanying drawings, or both, individually and in various combinations.

What we claim is:

1. A spreading implement comprising a frame supporting a hopper for material to be spread and an elongated conveyor system extending laterally from each side of said hopper with respect to the direction of normal travel, said system comprising side-by-side elongated conveyors that extend laterally from each side of said hopper, outlet means adjacent the bottom of said hopper and said oulet means communicating material to said conveyors, driving means connected to move said conveyors and each conveyor comprising a belt having an outer end with a rotatable spreading member being positioned adjacent said end, said spreading member being engaged by said driving means and synchronized with the movement speed of said conveyors, said conveyor system including a boom that is connected to said frame by two pivot connections, said boom being pivotable relative to said frame about an upwardly extending axis and a substantially horizontal axis, and said driving means having transmission parts mounted on said boom that disengage when said boom is pivoted about the upwardly extending axis.

2. A spreading implement comprising a frame supporting a hopper for material to be spread and an elongated conveyor extending laterally from each side of said hopper with respect to the direction of normal travel of the implement, the inner end of said conveyor system communicating with at least one outlet of said hopper and at least one rotatable spreading member being supported on said system a substantial distance from a port of said outlet, said spreading member being rotatable about an upwardly extending axis and at least one movable conveyor of said system extending from said outlet to said rotatable member, said conveyor including a belt supported on a frame boom that extends laterally from said outlet and said boom comprising at least one beam that is pivoted relative to the remainder of said frame and turnable about an upwardly extending axis, driving means connected to each conveyor and spreading member, said driving means including belt and pulley means positioned along the length of said boom, a plurality of said conveyors being provided having belts of differenet lengths supported on said boom, each said conveyor belt having a corresponding rotatable spreading member associated with it to spread corresponding streams of material conveyed from said hopper, each said spreading member being mounted on a shaft and bearing which are displaceable relative to the corresponding conveyor belt, each said spreading member being connected to said driving means and the latter including a conveyor belt pulley of the corresponding conveyor by way of a corresponding belt and pulley transmission, guide pulleys of each belt and pulley transmission being mounted on a corresponding conveyor support, a guide being located between the outer end of each conveyor and the respective spreading member, said guide being connected to said support, means for adjusting said guide relative to said spreading member, each said guide pulley being mounted on said support.

3. An implement as claimed in claim 2, wherein each support is adjustable in a direction that is parallel to the longitudinal center line of said conveyor.

4. An implement as claimed in claim 3, wherein said spreading member has an upper surface spaced vertically from the conveying surface of the corresponding conveyor by a distance that is at least equal to the radius of that spreading member.

5. A spreading implement comprising a frame supporting a hopper for material to be spread and an elongated conveyor system extending laterally from each side of said hopper with respect to the direction of normal direction of the implement the inner end of said conveyor system communicating with at least one outlet of said hopper and at least one rotatable spreading member being supported on said system a substantial distance from a port of said oultet, said spreading member being rotatable about an upwardly extending axis and at least one movable conveyor of said system extending from said outlet to said rotatable member, said conveyor including a belt supported on a frame boom that extends laterally from said outlet and said boom comprising at least one beam that is pivoted relative to the remainder of said frame and turnable about an upwardly extending axis, driving means connected to each conveyor and spreading member, said driving means including belt and pulley means positioned along the length of said boom, a plurality of said conveyors being provided having belts of different lengths supported on said boom, each said conveyor being connected to said driving means including a flexible belt and pulley transmission, the belt of said transmission extending between a driving pulley mounted on the implement frame and a driven pulley of the conveyor, a pivot pin located between said driving and driven pulleys adjacent said belt and interconnecting said boom with the remainder of the implement, said boom being displaceable about said pin, an abutment guide located adjacent said pin to prevent the belt from loosely falling off said pulleys.

6. An implement as claimed in claim 5, wherein said abutment guide is mounted on an upright bracket and a supporting arm for said boom is also secured to that bracket, said bracket being connected by lugs and pivot pins to the implement frame.

7. A spreading implement comprising a frame supporting a hopper for material to be spread and an elongated conveyor system extending laterally from each side of said hopper with respect to the direction of normal travel of the implement, the inner end of said conveyor system communicating with at least one outlet of said hopper and at least one rotatable spreading member being supported on said system a substantial distance from a port of said outlet, said spreading member being rotatable about an upwardly extending axis and at least one movable conveyor of said system extending from said outlet to said rotatable member said conveyor including a belt supported on a frame boom that extends laterally from said outlet and said boom comprising at least one beam that is pivoted relative to the remainder of said frame and turnable about an upwardly extending axis, driving means connected to each conveyor and spreading member, said driving means including belt and pulley means positioned along the length of said boom, a plurality of conveyors being provided which have belts of different lengths supported on said boom, said conveyors being pivotable relative to the implement frame about a substantially horizontal axis, said boom being pivotable about said substantially horizontal axis relative to a supporting arm which interconnects said beams with the implement frame, said beams of said boom being connected to a supporting beam which extends substantially horizontally traverse to the longitudinal axes of said beams, the ends of said supporting beam having pivot pins that are turnably engaged in lugs on said support arm, said conveyor being driven by said driving means including a driving pulley and a driven pulley interconnected with a belt, said horizontal pivotal axis being located at that side of the driven pulley remote from said driving pulley.

8. An implement as claimed in claim 7, wherein a latch mechanism releasably interconnects the boom to said implement frame through a locking pin on said boom said locking pin fitting in a recess in a latch and said locking pin being slideable in said recess to allow for upward and downward displacements of said boom about said horizontal axis during operation.

9. A spreading implement comprising a frame supporting a hopper for material to be spread and an elongated conveyor system extending laterally from each side of said hopper with respect to the direction of normal travel of the implement, the inner end of said conveyor system communicating with at least one outlet of said hopper and at least one rotatable spreading member being supported on said system a substantial distance from a port of said outlet, at least one movable conveyor of said system extending from said outlet to said rotatable spreading member, said conveyor including a belt supported on a frame boom that extends laterally from said outlet and said boom comprising at least one beam that is pivoted relative to the remainder of said frame about a horizontal axis, a flow control member disposed between said outlet port and said belt, said flow control member defining under said outlet port openings of triangular form, said flow control member including means for moving same parallel to the longitudinal direction of said belt, said outlet port having a length greater than its width with its longitudinal axis along its length being in a direction transverse to the longitudinal direction of said conveyor belt.

10. A spreading implement comprising a frame supporting a hopper for material to be spread and an elongated conveyor system extending laterally from each side of said hopper with respect to the direction of normal travel of the implement, the inner end of said conveyor system communicating with at least one outlet of said hopper and at least one rotatable spreading member being supported on said system a substantial distance from a port of said outlet, a plurality of movable conveyors of said system extending from said outlet to said rotatable spreading member, each of said conveyors including a belt supported on a frame boom that extends laterally from said outlet, said boom comprising at least one beam that is pivoted relative to the remainder of the frame about a horizontal axis whereby said conveyors are pivotable relative to the implement of about said horizontal axis, a pair of pulleys being provided to each said belt at its inboard and outboard ends, said rotatable axis being located between said pulleys for each said belt and substantially nearer to the inboard of said pulleys than the outboard of said pulleys, said inboard pulleys being mounted on a common further horizontal axis that is parallel to and at substantially the same height as said first mentioned horizontal axis.

11. A spreading implement in accordance with claim 10 wherein a flow control member is provided between said belts and said outlet port, said flow control member being provided with an elongated triangular opening over each said belt, said control member being movable in a direction parallel to the movement of said belts whereby portions of said triangular openings are selectively exposed to said outlet port for controlling the amount of material which is transmitted from said hopper onto said belts.

12. A spreading member comprising a frame supporting a hopper for material to be spread and an elongated conveyor system extending laterally from each side of said hopper with respect to the direction of normal travel of the implement, the inner end of said conveyor system communicating with at least one outlet of said hopper and at least one rotatable spreading member being supported on said system a substantial distance from a port of said outlet, at least one movable conveyor of said system extending from said outlet to said rotatable spreading member, said conveyor including a belt supported on a frame boom that extends laterally from said outlet and said boom comprising at least one beam that is pivoted relative to the remainder of said frame about a horizontal axis, driving means connected to each conveyor and spreading member, said driving means including belt and pulley means positioned along the length of said boom, a flow control member disposed between said outlet port and said belt, means for moving said flow control member in a direction parallel to the movement of said belt relative to said outlet port, said flow control member being carried by means connected to said hopper whereby the upper surface of said flow control member gently abuts against the lowermost edges of said hopper which defines said outlet port, said flow control member defining an opening disposed over said belt, said opening being substantially in the form of a isosceles triangle, a line bisecting each said triangle through its apex and the mid point of its base edge being disposed centrally above the underlying said belt.

13. A spreading implement comprising a frame supporting a hopper for material to be spread and an elongated conveyor system extending laterally from each side of said hopper with respect to the direction of normal travel of the implement, the inner end of said conveyor system communicating with at least one outlet of said hopper and a plurality of rotatable spreading members which are supported on said system at different substantial distances from said port of said outlet, each said spreading member being rotatable about an upwardly extending axis and a plurality of movable conveyors of said system extending from said outlet to a corresponding said rotatable member, each said conveyor including a belt of different length than the other said belts, said belts being supported on a frame boom that extends laterally from said outlet and said boom comprising at least two spaced apart and interconnected beams which are pivotable relative to the remainder of said frame and turnable about an upwardly extending axis, driving means connected to each said conveyor and spreading member, said driving means including belt and pulley means positioned along the length of said boom, said boom being comprised of at least two parts which are pivoted relative to each other, at least one conveyor on said boom being divided into corresponding longitudinal portions that are pivotable with said parts, said parts being pivotable relative to one another about a substantially vertical axis.

14. An implement as claimed in claim 13, wherein, as seen in plan view, the vertical axis is a pivot located adjacent each conveyor portion said pivot being fastened to at least one of said two beams.

15. An implement as claimed in claim 14, wherein said pivot is mounted between brackets at adjacent ends of the boom parts.

16. An implement as claimed in claim 15, wherein a releaseable latch device interconnects the relatively pivotable parts of said boom, said device normally maintaining said parts in alignment until a torque acting upon one of said parts in a direction to pivot that part relative to the other part, exceeds a predetermined value.

17. An implement as claimed in claim 16, wherein said latch device comprises a latch element turnably mounted on one boom part, a recess in said latch element engaging a locking pin fastened to the other boom part.

18. An implement as claimed in claim 17, wherein said element has a rod pivotally connected to it, said rod being entered through a hole in a supporting strip on said boom and being surrounded between that strip and an abutment on the rod, by a spring located at the side of said strip remote from said locking pin.

19. An implement as claimed in claim 14, wherein considered in the direction of travel, said locking pin is located at the front of said boom and said boom is pivoted to the implement frame to turn about a vertical axis located at the rear of said beam.

20. A spreading implement comprising a frame supporting a hopper for material to be spread and an elongated conveyor system extending laterally from each side of said hopper with respect to the direction of normal travel of the implement, the inner end of said conveyor system communicating with at least one outlet of said hopper and at least one rotatable spreading member being supported on said system a substantial distance from a port of said outlet, said spreading member being rotatable about an upwardly extending axis and at least one movable conveyor of said system extending from said outlet to said rotatable spreading member, said conveyor including a belt supported on a frame boom that extends laterally from said outlet and said boom comprising at least one beam that is pivotable about a horizontal axis relative to the remainder of said frame and turnable about a proximate further upwardly extending axis, said further axis located behind said conveyor system relative to the normal direction of travel of the implement in operation, driving means connected to each conveyor and spreading member, said driving means including belt and pulley means positioned along the length of said boom, said conveyor belt having an upper run and a lower run, said upper run being supported in a channel-shaped guide of said system, each said channel-shaped guide having two upright rims that substantially engage the opposite ends of the upper run of said conveyor belt, said channel-shaped guide comprising two opposed angle members, one limb of each said angle member being a corresponding said upright rim of said guide and the other said limbs thereof being directed towards one another in a spaced-apart relationship, said other limbs being interconnected by spaced bars, the distance between said other limbs being less than one-half of the overall width of said guide.

* * * * *